United States Patent [19]

Banerjee

[11] Patent Number: 4,475,293

[45] Date of Patent: Oct. 9, 1984

[54] CONTROLLED INERTING OF CHAMBER ATMOSPHERES

[75] Inventor: Ratan Banerjee, North Brunswick, N.J.

[73] Assignee: The BOC Group, Inc., Montvale, N.J.

[21] Appl. No.: 372,600

[22] Filed: Apr. 28, 1982

[51] Int. Cl.³ ............................................. F26B 3/04
[52] U.S. Cl. ........................................ 34/27; 34/32; 34/47; 34/54; 34/77
[58] Field of Search ................. 34/54, 77, 28, 32, 36, 34/27, 47; 118/61; 427/372.2, 377

[56] References Cited

U.S. PATENT DOCUMENTS

| | | | |
|---|---|---|---|
| 2,746,168 | 5/1966 | Rickabaugh | 34/75 |
| 3,909,953 | 10/1975 | Hemsath et al. | 34/32 |
| 4,150,494 | 4/1979 | Rothchild | 34/28 |
| 4,150,495 | 4/1979 | Stern | 34/54 |
| 4,337,582 | 7/1982 | Smith | 34/32 |

*Primary Examiner*—Larry I. Schwartz

*Attorney, Agent, or Firm*—David L. Rae; Larry R. Cassett

[57] ABSTRACT

A chamber such as a curing oven or drier is inerted during the curing of solvent borne resin coatings with the solvent vapor formed therein being withdrawn together with inert gas at a substantially constant flow rate. The withdrawn gas stream is supplied to a condensation unit to enable recovery of solvent and the non-condensed gas discharged from the condensation unit is returned to the oven at a flow rate which may be varied so as to maintain a material balance with respect to the oven atmosphere. Appropriate adjustments are made in response to changes occurring in the oven solvent vapor and/or oxygen concentration without disturbing the material balance mentioned above while the oven atmosphere is withdrawn at a substantially constant flow rate. A plurality of ovens may be connected to a single condensation unit and upon detecting undesired conditions such as excessive oxygen levels in one oven, the same may be separately isolated from the condensation unit.

17 Claims, 1 Drawing Figure

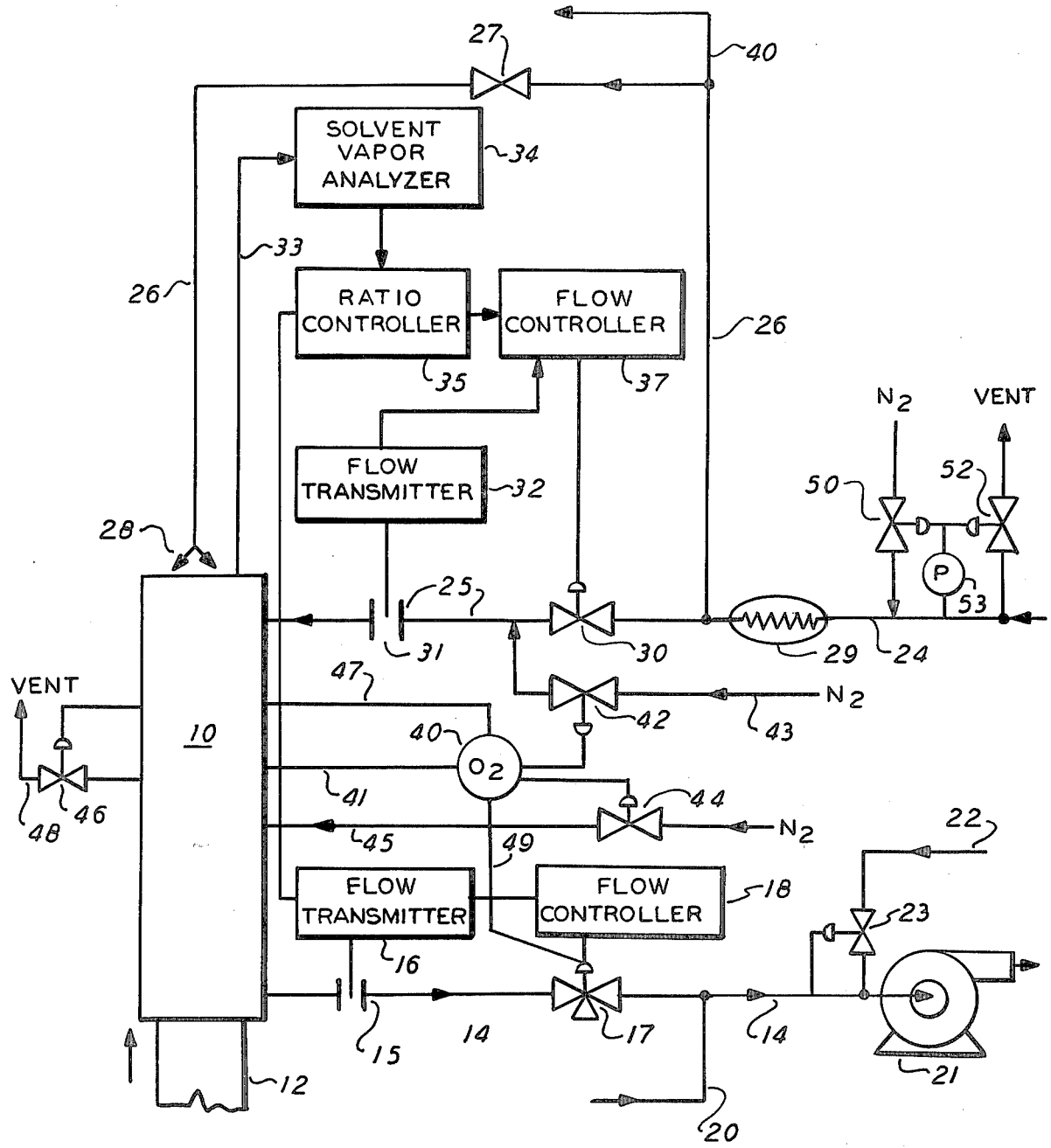

CONTROLLED INERTING OF CHAMBER ATMOSPHERES

BACKGROUND OF THE INVENTION

The present invention relates to methods and apparatus for recovering solvent vapor from an oven or the like and more particularly to such methods and apparatus wherein a material balance is maintained with respect to the oven atmosphere.

Prior art techniques for recovering solvent vapor from curing ovens during the curing of solvent borne resin coatings typically include the withdrawal of oven atmosphere and the condensation of solvent vapor therefrom. In certain processes, the oven atmosphere is comprised essentially of inert gas and solvent vapor and inert, noncondensed gas may be returned from the condensation unit to the oven for the purpose of inerting the oven. During such processes, internal oven conditions must be maintained such that solvent vapor remains in the oven atmosphere as the escape of solvent vapor presents environmental and safety hazards while the influx of excessive amounts of air may enable potentially explosive conditions to occur in the oven.

In addition to the foregoing requirement to maintain a material balance, it has been found that in order to provide for the efficient operation of a condensation unit designed to recover solvent vapor from an oven atmosphere comprised of such vapor and inert gas, it is preferred to supply the withdrawn atmosphere to a condensation unit at a substantially constant flow rate. An example of a preferred type of condensation or recovery unit is illustrated in U.S. Pat. No. 4,444,016 and which is assigned to the assignee of the present invention. A constant volume, rotary blower is preferably utilized as a means for supplying withdrawn atmosphere to the aforedescribed condensation unit and such blowers require that a substantially constant flow of gas be supplied thereto.

In prior art solvent recovery systems wherein inert gas is supplied to a curing oven, as for example is described in U.S. Pat. Nos. 4,150,494 and 4,337,582 both of which are assigned to the assignee of the present invention, conditions in the curing oven have been controlled in different modes. For example, in connection with the apparatus described in U.S. Pat. No. 4,150,494, the pressures existing in the oven and in the exit vestibule are detected and the flow of inert gas to the oven is controlled such that the pressure in the oven is maintained below that of the exit vestibule to assure that solvent vapor is retained in the oven and does not pass outwardly through the exit vestibule. However, in the event the oven pressure is less than a pre-set differential below the pressure in the entrance vestibule, the rate at which the oven atmosphere is withdrawn and is supplied to a condensation unit is increased to thereby effect a reduction of oven pressure. It has been found that the pressure differential existing between a vestibule and the oven interior is relatively small and that expensive, sophisticated instrumentation is required to reliably detect such pressures which is rendered even more difficult when large oven openings and relatively large gas flows exist. Consequently, it has been found in connection with such prior art solvent recovery systems that it is difficult if not virtually impossible to maintain a material balance with respect to the oven atmosphere. With regard to the system illustrated in U.S. Pat. No. 4,337,582, solvent vapor is precluded from condensing within an oven by assuring that the concentration of solvent vapor therein is maintained below a predetermined value. The actual solvent vapor concentration is monitored by sensing the dewpoint of such vapor in the oven and by assuring that such dewpoint remains below a predetermined dew point at which condensation would occur. This result is achieved by varying the rate at which solvent vapor is withdrawn from the oven such that upon detecting an increase in solvent vapor concentration, that is by sensing a dew point which approaches a predetermined dew point, the rate at which solvent vapor is withdrawn from the oven is increased thereby reducing the concentration of such vapor. Consequently, condensation of solvent vapor within the oven is precluded although a material balance with regard to the oven atmosphere is again difficult if not impossible to maintain with such prior art, solvent recovery systems. In addition to the requirement for controlling conditions in a particular curing oven, it is frequently desirable to connect a plurality of ovens to a single condensation unit as it may be economical to size such a single condensation unit to recover solvent vapor from a plurality of curing ovens. When a plurality of curing ovens are connected to a single condensation unit, it is important that variation of conditions in one oven does not affect other ovens. In the event one oven becomes "contaminated", that is, the oxygen content thereof exceeds a predetermined, safe level, it is important to be able to isolate such oven from the other ovens and the condensation unit so that the contaminated oven may be purged with a flow of inert gas and yet not impair the ability to recover solvent from other ovens which may be operating properly.

It will be appreciated by those skilled in the art that prior art techniques for controlling conditions within curing ovens to enable safe and effective operation thereof and the preferred operating conditions of condensation units are to some extent conflicting with one another. That is, oven control techniques have resorted to maximizing the rate at which oven atmosphere is withdrawn from the oven to enable lower temperatures to exist in the oven without causing vapor condensation in cold portions of the oven or on the material being cured, while solvent vapor condensation units require that minimum flow rates of oven atmospheres be supplied as feed streams to enable efficient condensation of solvent vapor. It will be understood that the efficiency of condensation units is essentially defined by the degree of refrigeration (i.e. liquid $N_2$ and electrical power) required to condense a given unit of solvent vapor and thus, the extent to which such refrigeration consumed in recovering solvent vapor is minimized, the more efficient is the unit. In addition, the lower the gas flow is to the condensation unit, smaller and less expensive equipment may be employed. The prior art techniques mentioned above tend to emphasize the dichotomy between the requirements of oven control on the one hand and efficient condensation of solvent recovery on the other hand and such prior art does not suggest how these conflicting requirements can be simultaneously met by an oven control system. Consequently, the prior art reflects a clear need for methods and apparatus for controlling curing ovens during the recovery of solvent vapor by maintaining a material balance with respect to the oven atmosphere to assure safe and reliable oven operating conditions and yet compensate for variations in such conditions during oven operation.

OBJECTS OF THE INVENTION

It is an object of the present invention to provide improved methods and apparatus for inerting a chamber such as a curing oven in a controlled manner.

It is another object of the present invention for providing improved methods and apparatus for recovering solvent vapor from an oven during the curing of solvent borne resin coatings therein.

It is yet another object of the present invention to provide improved methods and apparatus for recovering solvent vapor from a curing oven wherein a material balance is maintained with respect to oven atmosphere notwithstanding changes in the composition of such atmosphere.

It is a further object of the present invention to provide improved methods and apparatus for recovering solvent vapor from an oven wherein changes in oxygen level in the oven are corrected without disturbing the material balance with respect to the oven atmosphere.

It is still another object of the present invention to provide improved methods and apparatus for recovering solvent vapor from a curing oven wherein the oxygen level in such oven is maintained at a predetermined, safe value and excessive buildup of oxygen in the oven is averted.

It is another object of the present invention to provide methods and apparatus for recovering solvent vapor from a plurality of curing ovens by means of a single solvent vapor condensation unit.

Other objects of the invention will become apparent from the following description of exemplary embodiments thereof which follows and the novel features will be particularly pointed out in conjunction with the claims appended thereto.

SUMMARY

In accordance with the invention, solvent vapor is recovered from an inerted oven or drier during the curing of solvent borne resin coatings while a material balance is maintained with respect to the oven atmosphere notwithstanding changes in composition of this atmosphere. Consequently, a material balance is maintained even though the rate at which solvent is evaporated in the oven or the rate at which air may leak into the oven changes during oven operation. By maintaining a material balance as mentioned above, the flow of solvent vapor out of web openings or other entrances and exits of the oven is avoided as is the inward leakage of excess air. The methods and apparatus according to the invention also enable the conflicting requirements of controlling oven conditions during the recovery of solvent vapor and the efficient utilization of condensing apparatus to be simultaneously met and as will be discussed, such requirements can be met with components and other equipment which is readily available to those skilled in the art.

In order to compensate for changes in oven conditions such as changes in solvent vapor or oxygen concentrations, the flow of inert gas supplied to the oven, preferably in the form of noncondensed inert gas returned from the condensation unit, is adjusted in flow rate and/or composition. That is, in the event the solvent vapor concentration in the oven atmosphere increases, such a change is detected and the flow of inert gas returned to the oven is reduced so that a material balance is maintained with respect to the oven atmosphere. As the oven is inerted, an increase in solvent vapor concentration will not result in establishing potentially hazardous conditions.

In accordance with a further aspect of the invention, a predetermined oxygen level is maintained in the oven atmosphere, typically at a value of about 3%. In the event of an unexpected, transient increase in air leakage into the oven, the corresponding increased oxygen level will be detected and may be utilized to cause an increased flow of substantially pure inert gas, such as nitrogen, into the oven. This increased total flow of inert gas to the oven is detected and is utilized to control, i.e. reduce the flow rate at which inert gas is returned from the condensation unit so that the total flow of the pure inert gas and inert gas returned from the condensation unit to the oven is maintained at a value which preserves the aforementioned material balance in the oven. Therefore, notwithstanding adjustments made for both changes in solvent vapor and oxygen concentrations in the oven, the rate at which the oven atmosphere is withdrawn and is passed to a condensation unit will remain constant to enable the efficient operation of such condensation unit as mentioned above while yet preserving a material balance with respect to the oven atmosphere.

The level of oxygen in the curing oven is also sensed to detect any abnormally high levels, e.g. above about 5%, and upon detecting such a level, a flow of substantially pure inert gas such as nitrogen is introduced directly into the oven to purge the same while the withdrawn oven atmosphere is vented to the ambient atmosphere so that an oven so "contaminated" with oxygen is not able to supply the atmosphere thereof to the condensation unit. Thus, although one oven of a plurality of ovens connected to a single condensation unit may become contaminated, such an oven is isolated from the condensation unit which can then be readjusted for operation so as to recover solvent vapor from other, properly functioning curing ovens.

BRIEF DESCRIPTION OF THE DRAWING

The invention will be more clearly understood by reference to the following description of the exemplary embodiments thereof in conjunction with the following drawing in which the sole FIGURE is a diagrammatic view of apparatus for controlling conditions within a curing oven which is adapted to supply the atmosphere thereof to means for recovering solvent vapor therefrom.

DESCRIPTION OF PREFERRED EMBODIMENTS

Referring now to the drawing, illustrated therein is a chamber which may take the form of a curing oven or other drying device. For the purpose of convenience, chamber 10 will be referred to as a curing oven which is preferably adapted to enable the curing of solvent borne resin coatings being passed therethrough on a web material such as web 12. However, the methods and apparatus according to the invention are not limited to the curing of coatings on planar, web materials but may also be utilized in connection with the curing of coatings on, or drying of liquids on, non-planar articles. Typically, upon operation of oven 10, solvent is evaporated from the coating being cured and an oven atmosphere generally comprised of solvent vapor, inert gas such as nitrogen and a minor quantity of oxygen is formed therein. The oven atmosphere is removed through conduit 14 and the flow rate is detected by device 15 with this information being supplied by flow transmitter 16 to a ratio controller device 35 which will be described in greater detail hereafter. Flow transmitter 16 is also coupled to flow controller 18 which is effective to control the opening of valve 17 in response to signals supplied by flow transmitter 16. A control valve 17 which preferably is comprised of an adjustable valve is provided in conduit 14 and is effective to supply the withdrawn oven atmosphere at a substantially constant flow rate to the suction inlet of blower 21. Atmosphere which is withdrawn from one or more ovens (not shown) may be supplied through conduit 20 into conduit 14 to the suction inlet of blower 21. A supply of noncondensed gas from a condensation unit (not shown) is supplied through line 22 and valve 23 upon a pressure existing in line 14 below a predetermined value, thereby continually supplying "recycle" gas to the suction inlet of blower 21. Valve 23 will open only in the event an abnormally low pressure condition exists in conduit 14. The withdrawn oven atmosphere supplied to the suction inlet of blower 21 is increased in pressure therein and is supplied to a condensation unit (not shown) wherein the solvent vapor is condensed and the noncondensed gas is returned to oven 10 through conduit 24. Preferably, the condensation unit will comprise the apparatus described in Pat. No. 4,444,016 although other suitable solvent condensing equipment may be utilized.

The gas returned from the condensation unit through conduit 24 to oven 10 is typically comprised of approximately 97% inert gas such as nitrogen and 3% oxygen with a trace of solvent vapor. Since the condensation of solvent vapor generates a gas which is relatively cool compared to the atmosphere within oven 10, it is preferred to heat the gas being returned through conduit 24 by means of a suitable heating element 29 before supplying such gas through conduit 25 to oven 10. A major component of this heated gas in conduit 24 is supplied therethrough into oven 10 for the purpose of inerting the same and thus permitting relatively high partial pressures of solvent vapor to exist therein. As discussed in U.S. Pat. No. 4,150,494, by maintaining concentrations of solvent vapor in an inert atmosphere considerably above the upper explosive limit of such vapor in air, the possibility of hazardous conditions existing in oven 10 is virtually eliminated and condensation of such solvent vapor is readily facilitated as a consequence of utilizing relatively high solvent vapor concentrations, i.e. partial pressures. A minor portion of the inert gas supplied through line 24 to heater 29 is diverted through conduit 26 and valve 27 and is utilized to establish inert gas curtains at the entrance and exit of oven 10 as illustrated in the drawing. It will be understood that although an inert gas curtain is generally depicted at the exit of oven 10, a similar curtain will be established at the inlet in a similar manner and both of such curtains will act to prevent the ingress of ambient air into oven 10 thereby minimizing the influx of oxygen into the oven.

An adjustable valve 30 is disposed in conduit 24 and is operated by signals provided by flow controller 37 which in turn is coupled to ratio controller 35. Flow controllers 18 and 37 may take the form of a known device for controlling the operation of a valve in response to signals supplied thereto while ratio controller 35 may be a device available from Foxboro Corporation, Model E27AZ. The flow rate of gas in line 25 is detected by element 31 and a signal indicative of such flow rate is supplied by a flow transmitter 32 to flow controller 37. The concentration of solvent vapor within oven 10 is detected by a suitable device (not shown) and a signal representative of such concentration is supplied over line 33 to solvent vapor analyzer 34 which may take the form of the 973 Miran Model infrared hydrocarbon analyzer available from Foxboro.

As mentioned previously, due to almost unavoidable air leakage into oven 10, a relatively low oxygen concentration, preferably about 3% will exist therein and as this oxygen concentration is below flammable limits in a mixture also containing essentially only nitrogen and solvent vapor, hazardous conditions within oven 10 are averted. In order to maintain a desired oxygen level within oven 10 and to avoid excessive oxygen concentrations from occurring for any sustained period of time, an oxygen analyzer 40 is adapted to sense the oxygen concentration in oven 10 by means of a probe (not shown) coupled to electrical line 41. Oxygen analyzer 40 is effective to control the opening of a valve 42 which is connected in a conduit 43 through which substantially pure nitrogen gas, as opposed to inert gas returned from a condensation unit, is supplied. Typically, substantially pure nitrogen is continually supplied to valve 42 at a predetermined flow rate and is added to the gas returned from the condensation unit in conduit 25 for supply to oven 10. Oxygen analyzer 40 is also adapted to control the operation of valve 44 disposed in line 45 to which substantially pure nitrogen is also supplied. A further valve 46 is electrically coupled to oxygen analyzer 40 through line 47 and upon receipt of an appropriate signal, valve 46 will open so as to the vent the atmosphere within oven 10 to ambient atmosphere through conduit 48. Similarly, oxygen analyzer 40 is electrically connected to valve 17 in line 14 so as to cause valve 17 to close upon occurrence of an abnormally high oxygen level in oven 10 which in turn results in closure of valve 30 and complete isolation of oven 10 from the condensation unit and the other ovens, if any.

In the event that the flow of noncondensed gas returned from a condensation unit through line 24 is insufficient to inert oven 10, a flow of makeup, substantially pure inert gas such as nitrogen is continually supplied through valve 50 into line 24. A pressure sensing device 53 is effective to detect the pressure in line 24 and in the event such pressure decreases below a predetermined value, valve 50 is opened further such that the flow rate of pure nitrogen into line 24 is increased. A vent valve 52, which is generally closed, is also responsive to pressure sensing device 53 and will be opened upon detection of an abnormally high pressure in line 24 so as to vent the gas returned from the condensation unit to ambient. It will be appreciated that vent valve 52 will also be opened upon purging of a condensation unit prior to startup thereof although generally, valve 52 will remain closed during normal operation of oven 10.

Operation of the apparatus illustrated in the drawing will now be described. Initially, flow controller 18 is set to establish a constant flow rate of gas withdrawn from oven 10 through conduit 14 by setting control valve 17 to a predetermined opening. The flow rate of this withdrawn gas is detected by device 15 and is supplied to flow transmitter 16 which is effective to supply signals representative of such flow rate to controller 18 and ratio controller 35. The flow of gas withdrawn from a further oven (not shown) is supplied through conduit 20 and joins the flow of gas, that is, a mixture comprised of inert gas such as nitrogen, solvent vapor and minor quantities of oxygen as described above, in line 14 which in turn is supplied to the suction inlet of a rotary blower 21. A flow of recycled gas supplied through line 22 is passed through valve 23 and the opening of this valve is adjusted so as to assure a substantially constant flow of gas being supplied to the inlet of blower 21. In the event, for example, that the flow of withdrawn gas through conduit 20 is terminated due to the detection of an abnormal condition in the further oven, the pressure within line 14 will drop and such a pressure drop will be detected and utilized to open further valve 23 which in turn will supply a greater flow rate of recycled gas to the inlet of blower 21 to thereby assure that a substantially constant flow rate of gas is supplied to the rotary blower 21.

As mentioned previously, the noncondensed gas emitted from the condensation unit, which gas is comprised essentially of nitrogen and a minor quantity of oxygen, is returned through conduit 24 to heater 29 wherein the same is heated and this gas is then divided into a first flow through valve 30, conduit 25, flow detecting device 31 and into oven 10 while a second flow is supplied through conduit 26 and valve 27 to be utilized to establish gas curtains 28 at the entrance and exit of oven 10. The flow of gas in conduit 25 is detected by device 31 which in turn supplies a signal to flow transmitter 32 which is effective to supply a signal representative of such flow to ratio controller 35. The concentration of solvent vapor in oven 10 is detected and a signal is supplied through line 33 to solvent vapor analyzer 34 which provides an output representative of such solvent vapor concentration to ratio controller 35. The output of ratio controller 35 is the set point for flow controller 37 which in turn is effective to control the opening of valve 30 and hence the flow of gas through this valve.

As mentioned previously, a material balance is maintained with respect to the oven atmosphere and in the event that an increase in solvent vapor concentration is detected within oven 10, which may occur from the introduction of a coating containing a greater quantity of solvent per unit of area or an increase in the line speed of web 12, etc., a signal will be supplied to solvent vapor analyzer 34. In the event the solvent vapor concentration increases from a predetermined or set value, such an increase will be detected and will cause ratio controller 35 to supply a signal to flow controller 37 which in turn will be effective to adjust control valve 30 to a more closed position thereby reducing the flow of gas returned from the condensation unit returned through line 25 to oven 10 and consequently, supply a somewhat greater flow of such returned gas through conduit 26 to inert gas curtains 28. In this manner, a material balance is maintained with respect to the atmosphere of oven 10 for the reason that as the quantity of solvent vapor being formed in oven 10 increases, and the oven atmosphere is withdrawn at a constant rate through conduit 14, the flow of gas returned to oven 10 is reduced with the extent of such flow reduction of gas in line 25 being substantially equal to the increased quantities of solvent vapor being formed in oven 10. The consequence of this material balance is that there is essentially no net flow of solvent vapor out of the entrance and exit of oven 10 through which web 12 passes nor is there any significant influx of air through these entrances and exits. As long as the solvent vapor concentration within oven 10 does not rise to a level such that the coating on web 12 is not fully cured upon exiting oven 10, the increase in solvent vapor concentration can be withstood and the aforementioned material balance can be maintained. Thus, notwithstanding changes in the composition of an oven atmosphere, the material balance of such atmosphere can be maintained and a flow of oven atmosphere may be withdrawn and supplied to a condensation unit.

It will be understood that the set point of analyzer 34 may be set such that oven 10 will operate at the maximum, safe solvent concentration compatible with the recovery of solvent under normal operating temperatures. This insures that the rate of withdrawal of oven atmosphere is minimized for given oven conditions.

As indicated above, circumstances may arise under which the solvent loading increases sharply, i.e. solvent component of a coating on web 12 is not fully cured and/or solvent vapor condenses within the oven atmosphere thus resulting in an uncured coating on web 12 as this web leaves oven 10. Upon detecting such a condition, which may be visually apparent, the setting of flow controller 18 may be either manually, or automatically (by supplying a signal from analyzer 34), adjusted such that a greater flow of oven atmosphere is withdrawn through conduit 14. This greater flow, however, will still be a substantially constant flow supplied to the suction inlet of 21 and as this new, greater flow will develop a higher pressure in conduit 14, valve 23 will close thereby reducing the flow of recycle gas through conduit 22 and hence assuring that a substantially constant flow of gas is supplied to the suction inlet of rotary blower 21. It is believed, however, that during normal operating conditions, increases in solvent vapor concentration within an oven can be sustained without the need to reset flow controller 18. Again, in the event it is necessary to make such an adjustment of controller 18, the same can be readily made with apparatus according to the invention.

Due to inevitable leakage of air into oven 10, a minor concentration of oxygen will be maintained therein during the curing of solvent borne resin coatings. Typically, a concentration of about 3% oxygen will occur and such a concentration may be detected by means of oxygen analyzer 40. In the event that a concentration of greater than 3% oxygen is detected in oven 10, analyzer 40 is effective to supply a signal to control valve 42 which in turn will open further to enable an increased flow of substantially pure inert gas therethrough. This flow of substantially pure inert gas, i.e. nitrogen, will join the flow of returned gas in conduit 25 and this combined flow will be detected by device 31 and a signal representative of such a flow will be supplied by flow transmitter 32 to flow controller 37. The latter device will close valve 30 so as to reduce the flow rate of returned gas supplied therethrough until the ratio of the flow rate in conduit 25 with respect to the flow rate of withdrawn gas in conduit 14 is brought to a required value which is dictated by the output of analyzer 34. Consequently, the total flow rate of gas supplied through conduit 25 into oven 10 will remain at a predetermined flow rate notwithstanding changes in the oxygen level within oven 10 although the gas returned to oven 10 through line 25 will contain significantly lower levels of oxygen and thus, the concentration of oxygen in oven 10 will be reduced until a predetermined value, i.e. about 3% is detected by analyzer 40. In this manner, a material balance is maintained with respect to the atmosphere of oven 10 notwithstanding changes in the oxygen level therein.

In order to assure that safe operating conditions prevail in oven 10 in virtually all circumstances, oxygen analyzer 40 will be effective to cause a flow of pure nitrogen through valve 44 and conduit 45 to enter oven 10 upon detecting an unusually high oxygen level therein. Thus, in the event of a sudden, large unexpected influx of ambient air into oven 10, oxygen analyzer 40, which may also be set to detect oxygen levels at 5% or greater, will supply a signal to control valve 44 to open the same and commence flow of pure nitrogen through line 45 into oven 10. At the same time, analyzer 40 will supply a signal through line 47 to valve 46 thereby opening this valve and venting oven 10 to atmosphere through conduit 48. In addition, analyzer 40 will supply a signal through line 49 to control valve 17 causing this valve to close and thereby interrupt the flow in line 14 which in turn will be detected by flow transmitter 16. Ratio controller 35 will then cause flow controller 37 to supply a signal to valve 30 closing the same. In this manner, the contaminated atmosphere in oven 10 is isolated from other ovens and the condensation unit. Thus, not only will the level of oxygen in oven 10 be maintained at a predetermined, desired level such as 3% but that in the event of severe, undesired transient conditions, oven 10 may be purged and vented as mentioned above to assure that potentially explosive conditions do not prevail.

The flow of inert gas supplied through conduit 25 to oven 10 and through conduit 26 to inert gas curtains 28 may be adequate to inert oven 10 by simply returning the gas supplied from the condensation unit through conduit 24. However, as the flow rate of this gas is determined by the requirements to condense solvent as opposed to the requirements to inert a particular oven, it may be necessary to provide additional, makeup inert gas that is substantially pure nitrogen to assure that a sufficient flow of inert gas is returned to oven 10 so that oxygen levels therein may be maintained at desired concentrations. In order to assure that a sufficient flow rate of inert gas is maintained, makeup nitrogen is supplied through valve 50 to line 24 and depending upon the pressure in line 24, the flow of makeup nitrogen will be controlled accordingly. That is, should the pressure in line 24 decrease below a predetermined value, such a decrease will be detected by pressure indicating device 53 which in turn will cause valve 50 to open and thereby increase the flow rate of nitrogen supplied to conduit 24. A vent valve 52 may be opened upon detection of a pressure above a predetermined value by means of device 53 or upon the purging of the condensation unit by controlling the opening of valve 52 accordingly. During normal operations, valve 52 will remain in a closed condition and all gas returned from the condensation unit will be supplied through conduit 24 to conduits 25 and 26 as mentioned above.

The foregoing and other various changes in form and details may be made without departing from the spirit and scope of the present invention. Consequently, it is intended that the appended claims be interpreted as including all such changes and modifications.

I claim:

1. A method of maintaining a material balance with respect to gas flows into and out of a curing oven during the recovery of solvent vapor from the curing oven atmosphere which is comprised substantially of solvent vapor, inert gas and minor quantities of oxygen comprising the steps of withdrawing said oven atmosphere and passing the same to a condensation unit wherein said solvent vapor is condensed and from which said inert gas and minor quantities of oxygen are returned to said oven; the improvement comprising withdrawing said oven atmosphere at a substantially constant flow rate from said oven;

sensing the solvent vapor concentration of said oven atmosphere; and varying the flow rate at which said inert gas and minor quantities of oxygen are returned to said oven in response to sensed changes in said oven solvent vapor concentration such that a material balance is maintained with respect to (i) solvent vapor formed in said oven and said inert gas and minor quantities of oxygen returned to said oven versus (ii) said oven atmosphere withdrawn from said oven.

2. The method defined in claim 1 wherein the step of varying the flow rate of said return gas flow comprises sensing the flow rate of the withdrawn oven atmosphere;

sensing the flow rate of said return gas flow; and altering the ratio of the return gas flow rate to the withdrawn oven atmosphere flow rate in response to changes in the sensed solvent vapor concentration by varying the return gas flow rate such that the altered return gas flow rate results in said material balance being re-established.

3. The method defined in claim 2 wherein the step of altering said ratio comprises adjusting the opening of a valve in a conduit through which said return gas flow is supplied such that upon closure of said opening a portion of said return flow is diverted away from the interior of said oven.

4. The method defined in claim 3 wherein the step of diverting a portion of said return flow comprises supplying said diverted flow to the exterior of said oven in the vicinity of an aperture through which a material bearing said coating undergoing curing passes to form a substantially inert gas curtain in the vicinity of said oven aperture.

5. The method defined in claim 1 additionally comprising the steps of sensing the oxygen level in said oven atmosphere, adding a flow of substantially pure inert gas to said return gas flow upon said oxygen level exceeding a predetermined value and reducing the rate of said return gas flow thereby bringing said oven atmosphere into material balance and assuring safe oven operating conditions.

6. The method defined in claim 5 wherein the reduction in said return gas flow rate is substantially equal to the flow rate at which said substantially pure inert gas is added to said return flow.

7. The method as defined in claim 1 additionally comprising the steps of adding a continuous flow of substantially pure inert gas to said return gas flow;

sensing changes in the oxygen level in said oven from a predetermined value;

altering the rate of said continuous flow in response to said sensed changes in said oxygen level such that said oxygen level is brought to said predetermined value; and adjusting the flow rate of said return gas flow in response to changes in the rate of said continuous flow such that said material balance is maintained with respect to gas flows into and out of the oven.

8. The method defined in claim 7 wherein the step of supplying said continuous flow comprises passing said substantially pure inert gas through a valve having an adjustable opening; and wherein the step of altering the rate of said continuous flow comprises controlling the extent of the opening of said valve in response to said sensed oxygen level thereby controlling said flow rate and maintaining said oxygen level at said predetermined value.

9. The method defined in claim 7 wherein the step of sensing changes in the oven oxygen level comprises detecting oxygen levels above an undesired value greater than said predetermined value and additionally comprising the steps of introducing a further flow of substantially pure inert gas into the oven to thereby purge the oven and interrupting the flow of withdrawn gas to the condensation unit upon detection of said undesired oxygen level.

10. The method defined in claim 1 additionally comprising the steps of combining the withdrawn oven atmosphere with a flow of an atmosphere withdrawn from a further oven for passage as a combined flow to said condensation unit.

11. The method defined in claim 1 wherein said return gas flow is comprised substantially of less than 5% oxygen, balance nitrogen.

12. The method defined in claim 7 wherein said substantially pure inert gas is nitrogen.

13. Apparatus for maintaining a material balance with respect to gas flows into and out of a curing oven during recovery of solvent vapor from the curing oven atmosphere which is comprised of solvent vapor, inert gas and minor quantities of oxygen comprising means for withdrawing said atmosphere from said oven at a substantially constant flow rate; passing said withdrawn atmosphere to a condensation unit wherein said solvent vapor is condensed; means for returning a gas flow comprised of inert gas and minor quantities of oxygen from said condensation unit to said oven; means for sensing the solvent vapor concentration of said oven atmosphere; and means for varying the rate of said return gas flow in response to sensed changes in the solvent vapor concentration of said oven atmosphere such that a material balance is maintained with respect to (i) solvent vapor formed in said oven and said inert gas and minor quantities of oxygen returned to said oven versus (ii) said oven atmosphere withdrawn from said oven.

14. The apparatus defined in claim 13 wherein said means for varying the flow rate of said inert gas comprises means for sensing the flow rate of said withdrawn oven atmosphere; means for sensing the flow rate of said gas returned from said condensation unit; means for determining the ratio of said sensed flow rates and means for altering said ratio by varying the flow rate of said return gas such that said altered flow results in the material balance being re-established.

15. The apparatus defined in claim 14 wherein said means for altering said return gas flow rate comprises a valve in a conduit through which said return gas flows; and additionally comprising further conduit means connected to said conduit at a location upstream of said valve in the direction of flow of said return gas with said further conduit means being disposed in relating to said oven to discharge a portion of said return gas flow in the vicinity of an oven aperture to establish an inert gas curtain in the vicinity of said aperture.

16. The apparatus defined in claim 15 additionally comprising means for supplying a flow of substantially pure inert gas into said conduit at a location downstream of said valve in the direction of flow of said return gas; means for sensing the oxygen concentration in said oven atmosphere; and means responsive to said sensing means for controlling the flow rate of said substantially pure inert gas to maintain said oxygen concentration at a predetermined value.

17. The apparatus defined in claim 16 wherein said means for varying said return gas flow rate are responsive to changes in said combined flow rate of said return gas and said substantially pure inert gas such that said return gas flow rate is varied in response to changes in the flow rate of said substantially pure inert gas to maintain said material balance with respect to the oven atmosphere.

* * * * *